United States Patent
Kimbrell

(10) Patent No.: US 6,673,119 B2
(45) Date of Patent: Jan. 6, 2004

(54) CHEMICAL MODIFICATION OF HYDROLIZABLE POLYMER-CONTAINING TEXTILE ARTICLES

(75) Inventor: William C. Kimbrell, Spartanburg, SC (US)

(73) Assignee: Milliken & Company, Spartanburg, SC (US)

(*) Notice: Subject to any disclaimer, the term of this patent is extended or adjusted under 35 U.S.C. 154(b) by 0 days.

(21) Appl. No.: 09/943,927

(22) Filed: Aug. 31, 2001

(65) Prior Publication Data

US 2003/0046771 A1 Mar. 13, 2003

(51) Int. Cl.[7] .................. C09B 62/00; D06M 13/322; B05D 3/00; C08K 5/52
(52) U.S. Cl. ................. 8/115.51; 8/541; 8/196; 427/394; 428/364; 428/373; 524/191
(58) Field of Search .............. 8/541, 196; 427/394; 428/364, 373; 524/191

(56) References Cited

U.S. PATENT DOCUMENTS

| | | | |
|---|---|---|---|
| 2,897,042 A | 7/1959 | Heiks | 8/130.1 |
| 3,104,450 A | 9/1963 | Christens et al. | 57/140 |
| 3,396,446 A | 8/1968 | Eggleston et al. | 28/76 |
| 4,103,051 A | 7/1978 | Farmer | 427/394 |
| 6,113,656 A | 9/2000 | Kimbrell | 8/541 |

*Primary Examiner*—Yogendra N. Gupta
*Assistant Examiner*—Preeti Kumar
(74) *Attorney, Agent, or Firm*—Terry T. Moyer; Brenda D. Wentz

(57) ABSTRACT

A hydrolizable polymer-containing textile article and method for producing the same is provided that has been chemically modified by treating the article with certain branched chain amines to reduce the strength of the fibers contained therein, thus rendering the article less prone to the formation of objectionable pill balls, thereby increasing wearer comfort and retaining the desired appearance of the article, and thereby extending the useful life of the article.

6 Claims, 1 Drawing Sheet

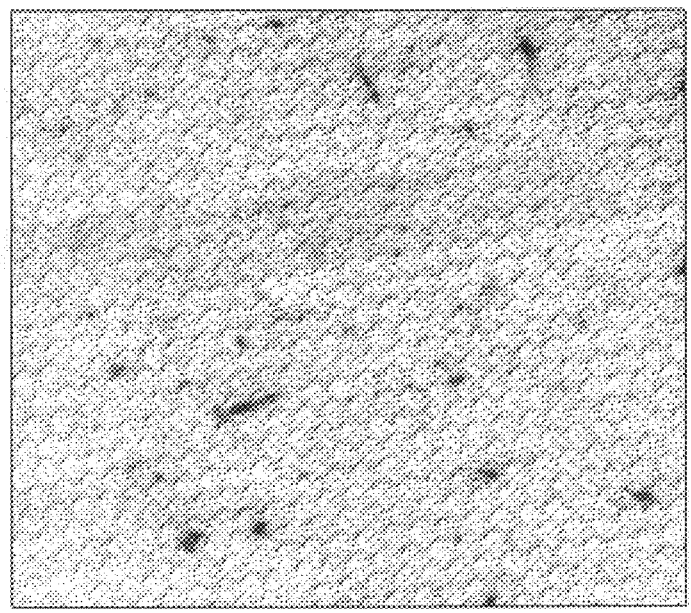
FIG. —1A—
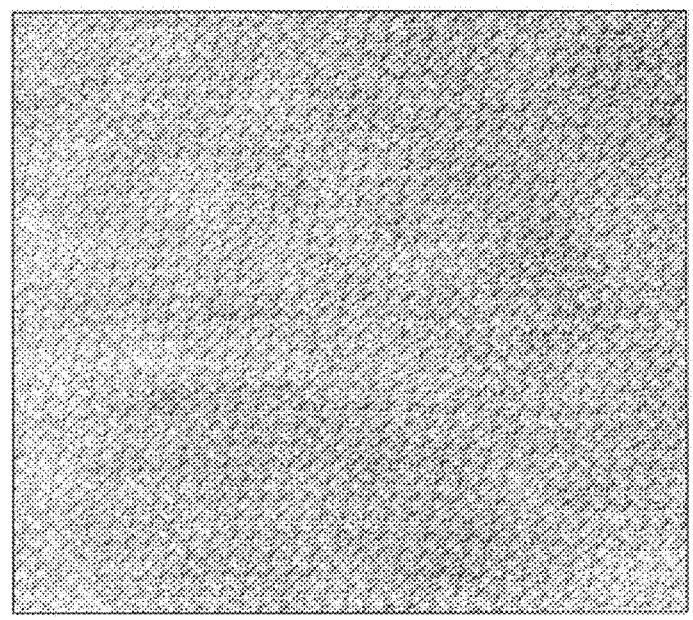
FIG. —1B—

CHEMICAL MODIFICATION OF HYDROLIZABLE POLYMER-CONTAINING TEXTILE ARTICLES

BACKGROUND OF THE INVENTION

This invention relates to a process for chemically modifying textile articles which contain hydrolizable polymers to reduce pilling tendency.

Hydrolizable polymers, such as polyester, possess many attributes that lead to their use for many items of commerce, such as fibers, films and molded products. Among these attributes are strength and toughness of the products, lack of reactive surface groups that can lead to staining, and various other advantages. However, many of these attributes can become problematic for certain end uses of the polymers. For example, the tenacity and other strength properties of the hydrolizable polymers such as polyester contribute to their outstanding performance as textile fibers and various other applications, such as films. However, this same strength characteristic can result in a phenomenon known as pilling if this fiber is manufactured, for example, into a spun yarn or in the manufacture of certain microdenier yarns.

Pilling results from fibers being pulled out of the fiber bundle and becoming entangled into a "ball" due to mechanical action, such as rubbing that, for example, fabrics encounter during normal use. Fabrics composed of cellulosic fibers experience similar action, but because the fiber is much weaker, the "pill balls" tend to break off before they become objectionable. These "pill balls" are a detriment to the appearance and comfort of textile articles. Reducing or eliminating the pilling propensity of hydrolizable polymer-containing textile articles would typically extend the useful life of the end-use product, such as a garment, by retaining its original appearance and comfort. Various products introduced by the fiber producers, such as low pill T-351 Trevira® polyester fiber from Hoechst-Celanese, have resulted in some degree of success in reducing pilling tendency. U.S. Pat. No. 3,104,450 to E. I. du Pont de Nemours and Company suggests that by controlling the relative viscosity and the break elongation of polyester fibers, one can reduce the pilling tendency of fabrics containing those spun polyester yarns.

Two major disadvantages are typically associated with fiber modifications made by the fiber producers in attempting to resolve the pilling issue. First, if the fiber producer lowers the fiber strength to the level required for good resistance to pilling, it becomes difficult for the yarn manufacturer to spin the yarn without excessive breaks and resulting off-quality. This necessitates further treatment to adequately reduce the yarn strength, such as alkaline hydrolysis after fabric formation or in a subsequent laundering step, to provide good resistance to pilling. Second, due to the vast number of fiber options (such as denier, cross-section, staple length, etc.) desired in the market, the fiber producer experiences cost, quality, and capacity issues associated with the spinning of small quantities of specialty fibers.

Textile manufacturers face a multitude of challenges in attempting to resolve the pilling issue on textile articles containing hydrolizable polymers. For example, textile chemists have applied binders to increase the force required to remove fibers from the fiber bundle; however, this typically results in detrimental changes to the feel of a fabric, and the effect is generally reduced by washing the fabric or end-use product (i.e. a garment). Some effort has been devoted to lowering the fiber strength by various chemical treatments. Hydrolysis with, for instance, sodium hydroxide does indeed lower the fiber strength, but it is difficult to precisely control this process and the resulting fabric also undergoes a significant weight loss. Aminolysis of the ester linkage of the polymer, such as addressed by Farmer in commonly-assigned U.S. Pat. No. 4,103,051, incorporated by reference herein, indeed can achieve the desired properties in many instances, but also can adversely affect the dyeing of the resulting fabric. This disadvantage is addressed by commonly-assigned U.S. Pat. No. 6,113,656 to Kimbrell which discloses a method for improving the dyeing of fabric treated with the Farmer chemistry. In addition, the structure of the amines disclosed by Farmer, especially those preferred by Farmer, can lead to chemical handling issues in textile finishing facilities (as will be discussed further herein) and also to quality issues resulting from attempting to handle such chemicals. Furthermore, it has proven difficult to control the batch to batch variation, within a somewhat narrow range, on certain styles, which in turn, leads to significant treated yardage that is not acceptable, either due to poor pilling performance or excessive strength loss.

More specifically, Farmer describes in U.S. Pat. No. 4,103,051 that organic amines are a particularly preferred class of compounds for this type of reaction, resulting in generally good control of the degree of pilling improvement obtained. Farmer discloses the use of aliphatic amines containing at least 10 carbon atoms. In addition, Farmer states that fatty diamines such as n-coco-1,3-propanediamine, are the preferred amines for this process.

It has been found that the use of the above-mentioned fatty diamines can impart detrimental variability to the textiles treated by this process. First these fatty diamines, especially those containing greater than 10 carbon atoms, tend to solidify at or around room temperature. This necessitates special storage and handling requirements in a typical textile dyeing operation such as, for example, drum heaters or other heating equipment to maintain the amine at a temperature above its melting point. Second, these compounds, such as the n-coco-1,3-propanediamine preferred by Farmer, are mixtures of unbranched carbon chains containing from 8 to 18 carbon atoms. This mixture tends to separate according to the size of the carbon chain resulting in unacceptable variations of the chemical composition and the degree of strength reduction obtained by this process. This again leads to special chemical handling requirements to minimize this potential variable, such as the use of drum mixers. Finally such diamines are known to adsorb and react with carbon dioxide from the air, resulting in an insoluble carbamate that does not react with polyester or other hydrolizable polymers. Without special attention to controlling the exposure of these amines to the air, various mixtures of products result. The net result can be less than the necessary amount of active amine being used to obtain the required strength reduction necessary to achieve good pilling performance. All of these potential chemical variations result in a process that can be very difficult to control within acceptable product performance tolerances.

SUMMARY OF THE INVENTION

In light of the foregoing discussion, it is one object of the current invention to achieve a textile article, which contains hydrolizable polymers that have been chemically modified by branched chain amine treatment, that has consistently good pilling and acceptable strength characteristics. A textile article includes fiber, yarn, fabric, film, etc. or any combination thereof. The textile article may be dyed or undyed. As used herein, a hydrolizable polymer is or includes any polymer that is capable of undergoing a hydrolysis reaction, such as, for instance, polyester. The term hydrolysis is used herein to include any reaction that typically results in the cleavage of the ester linkage in the polymer. Without being bound by theory, it is believed that this cleavage is the mechanism by which the textile article is weakened and improved resistance to pilling is obtained. Hydrolysis can include the addition of water, resulting in the re-formation of carboxylic acid and alcohol moieties, and can include a reaction with acids or bases. If amines are utilized, the resulting decomposition products are an alcohol and an amide. Hydrolysis reactions can also occur with polymers such as wool, such that an amide linkage is cleaved. However, this reaction typically requires more robust treatment conditions such as increased temperature, increased amine concentration, etc.

By good pilling, it is meant that the article achieves a minimum 3.0 rating after 30, 60, or 90 minutes when tested for Random Tumble Pilling according to ASTM test method D 3512-99A and is typically dependent upon the composition of the article being treated, the method of manufacture of the article, the amine used for treatment, etc. The amount of strength that will generally be considered to be "acceptable" is the strength required for the treated article to function within its anticipated end product for a minimum number of use or wear cycles, which will generally also include intermittent cleaning cycles as well. The strength that is considered to be acceptable for a given article will therefore vary depending on the type of treated article, how it will be used in an end product, the type of end product, etc. By way of example, acceptable strength for an article intended for use in knit shirting is achieved with a minimum 50 pound rating when tested for Mullen Burst Strength according to ASTM test method D 3786-87. More specifically, by experience it has been determined that a certain double knit (24 gauge) 100% polyester tuck fabric to be used in knit shirting should have strength of about 50 pounds, but no more than 90 pounds, when tested for Mullen Burst Strength according to ASTM test method D 3786-87, and preferably, between 55–65 pounds. If the Mullen Burst Strength exceeds 65 pounds, unacceptable pilling performance is obtained on this particular style. If the Mullen Burst Strength drops below 50 pounds, the fabric is generally considered to be too weak for apparel applications and holes may be punctured into the garment during normal use conditions.

As an ASTM test method, Mullen Burst Strength is typically used for determining the strength of knit or non-woven fabrics. If the treated fabric is a woven fabric, or if fibers or yarns are modified by the process of the current invention, other methods for determining the strength of the textile article must generally be used. By way of example, these methods include determining the tear strength of a woven fabric or determining the tensile strength of the fibers or yarns using test methods which are known and available to those skilled in the art.

Similarly, other standard methods for evaluating the pilling resistance of fabrics or fibers and yarns exist and may be used. By way of example, these methods include Brush and Sponge, Martindale and Elastomeric Pad methods which are known and available to those skilled in the art.

A second object of the current invention is to achieve a textile article, which contains hydrolizable polymers that have been chemically modified by branched chain amine treatment, that maintains its aesthetic appearance and comfort properties due to its improved resistance to pilling. The formation of "pill balls" leads to an unsightly appearance of the article. In addition, these "pill balls," when found in a garment, for example, generally result in a loss of garment comfort due to the abrasive nature of these protrusions against the skin. Therefore, reducing or eliminating the formation of "pill balls" allows for the extension of the useful life of textile articles, such as apparel, made from hydrolizable polymer-containing fabric.

It is also an object of the current invention to achieve a method for modifying textile articles, such as fabrics containing hydrolizable polymer fibers and/or yarns, with branched chain amines to reduce their propensity to pill while at the same time maintaining acceptable strength characteristics. The chemical structure of these amines improves both the process of modifying the hydrolizable polymer-containing textile articles and reduces or eliminates certain quality and cost issues associated with variations in this process. These variations are believed to be caused by the chemical compositions of amines disclosed in the prior art and the chemical handling procedures typical in a textile dyeing and finishing operation. This method also generally reduces the process and product variability associated with the prior art.

It is another object of the current invention to achieve a substituted hydrolizable polymer wherein the substitute is a branched chain amine. It is generally believed that this polymer is a reaction product that is formed after the textile article has been treated with the branched chain amine.

Other objects, advantages, and features of the current invention will occur to those skilled in the art. Thus, while the invention will be described and disclosed in connection with certain preferred embodiments and procedures, such embodiments and procedures are not intended to limit the scope of the current invention. Rather, it is intended that all such alternative embodiments, procedures, and modifications are included within the scope and spirit of the disclosed invention and limited only by the appended claims and their equivalents.

BRIEF DESCRIPTION OF THE DRAWINGS

FIG. 1A is a scanned image of an untreated sample of 100% double knit (24 gauge) polyester fabric showing the pill balls observed on the fabric when tested for Random Tumble Pilling according to ASTM test method D 3512-99A for 90 minutes.

FIG. 1B is a scanned image of a sample of the same fabric of FIG. 1A, but which was treated with isotridecyloxypropyl-1,3-diaminopropane, a branched chain alkyl amine according to the present invention, showing the lack of pill balls on the surface of the fabric when tested for Random Tumble Pilling according to ASTM test method D 3512-99A for 90 minutes.

DETAILED DESCRIPTION OF THE INVENTION

A textile article that contains hydrolizable polymer is provided that has been chemically modified to achieve a useful change in certain of its properties. The textile article may be a chemically modified fiber, yarn, fabric, film, etc. or any combination thereof, and the fiber or yarn may be used to manufacture a fabric. The fibers used to manufacture the yarns or fabrics can have any cross-section or any of the deniers commonly used for textile applications. By way of example, this would include round or multi-lobal cross-sections and deniers ranging from about 5 denier to less than 1 denier (namely, microdenier fibers) and can also include splittable (or bi- or multi-component) microfibers. By splittable microfibers, it is meant to include fibers co-extruded from two or more polymers that can be separated by chemical and/or mechanical treatment to yield two or more fibers of lower denier than the fiber that was initially extruded. Such chemical treatments may or may not result in the dissolution of some of the initial fiber material (as in the standard islands-in-the-sea type fibers).

Any hydrolizable polymer can be modified by treatment according to the invention, under the appropriate conditions, with ammonia or organic amines. By way of example, hydrolizable polymers include polyesters such as polyethylene terephthalate, polybutylene terephthalate, polytriphenylene terephthalate, other polyesters, wool, polylactic acid based polymers, and the like, and any combination thereof. As previously discussed, in the example of polyester, aminolysis of the ester linkage is believed to be the mechanism of reducing the polymer strength and thereby improving the resistance to pilling. Such aminolysis generally results in the formation of amide groups within the polymer chain by incorporation of the amine utilized in the reaction. These amide groups may be located on the surface of the fiber or anywhere within the fiber cross-section depending on the reaction conditions employed.

In addition, hydrolizable polymer-containing articles that have been chemically modified according to the present invention may be dyed using conventional textile dyeing procedures. The resulting dyed article is typically substantially spot-free and generally exhibits evenly distributed dye throughout the article.

In one practice of the present invention, a fabric containing certain polyester fibers is treated with certain branched chain amines prior to dyeing. Without wishing to be bound by any theory, such amines are believed to reduce the strength of the polyester fibers by aminolysis of the ester linkage of the polymer as previously discussed.

The fabrics of the current invention may be constructed from 100% spun polyester yarns, 100% microdenier filament polyester yarns, blends of spun and filament polyester yarns (which may be microdenier or non-microdenier filament yarns), and blends containing other fiber types, such as polyester and cotton blend fabrics. Suitable blends may contain, in addition to polyester fibers (which may be filament or staple fibers), other synthetic fibers, such as polyamides, polyolefins, polyacrylics, and regenerated cellulose fibers. Suitable blends may also incorporate other natural fibers, such as cotton, wool, linen, and flax. The fabrics of the current invention may be of any variety, including but not limited to, woven fabrics, knit fabrics, or non-woven fabrics or combinations thereof. They may optionally be colored by a variety of dyeing techniques, such as high temperature jet dyeing with disperse dyes, thermosol dyeing, pad dyeing, transfer printing or any other technique that is common in the art for comparable, equivalent, traditional textile products. If yarns or fibers are treated by the process of the current invention, they may be dyed by suitable methods prior to fabric formation, such as for instance package dyeing, or after fabric formation, or they may be left undyed.

The present invention discloses the use of certain branched chain amines that will reduce the hydrolizable polymer strength to a level required for acceptable resistance to pilling for textile applications, will reduce or eliminate all of the previously discussed potential chemical variations, and does not necessitate special storage and handling requirements. The amines are preferably chosen from the group consisting of aliphatic amines, alkyl amines, aliphatic substituted cyclic amines (as long as the substituent does not exhibit an electron withdrawing effect that renders the amine less reactive) and diamines or polyamines of the above-mentioned amine classes. The alkyl_ amines may be isodecyloxypropyl-1,3-diaminopropane, isododecyloxypropyl-1,3-diaminopropane, or isotridecyloxypropyl-1,3-diaminopropane.

The amines generally contain from 8 to 14 carbon atoms with a branched chain. Typically, the branch occurs at the third carbon atom. Other branched chain amines can be used, but preferably the substituent is not a mixture of products having a tendency to separate from each other (which can cause the consistency problems). It is preferable that substantially all of the branched chain amines have a molecular weight that varies by less than 42 atomic units both before and after the chemical reaction with the polymer. It is also preferable that the amine is a liquid within the range of temperature found in a typical textile dyeing facility. Substituted amines of this type generally have a substantially lower solidification temperature, such as below room temperature.

In addition, the branched chain reduces or eliminates the adsorption of carbon dioxide and the resulting carbamate formation. Without being bound by theory, it is believed that the branched chain provides a stearic hindrance to such carbamate formation. Also within this class of amines, one can obtain pure $C_8$ to $C_{14}$ substituents unlike the mixtures obtained with other classes of amines. This property reduces or eliminates the potential for separation of the chemical into its various fractions and also leads to more uniform reaction kinetics. All of these properties result in a chemical that is very consistent, despite day to day variations that can be expected in a textile dyeing facility. Accordingly, a more consistent, modified hydrolizable polymer-containing product is produced that repeatedly achieves good pilling performance and exhibits acceptable strength characteristics for its intended end-use. This is achieved even when the strength requirement for acceptable pilling approaches the minimum strength requirements dictated by the product end-use which, for example, may be an apparel garment that does not contain any holes or is not easily torn.

The concentration of the amine used to treat textile articles can be varied within a broad range, depending on the amount of degradation required to achieve acceptable pilling performance, and is related to the inherent strength of the textile article to be processed. The chosen amount of amine typically is between about 0.05% and 5% on weight of the article to be treated. Generally, this range is between about 0.10% and 1% on weight of the fabric. In other instances, this range is between about 0.20% and 0.70% on weight of the fabric to be treated. The inherent strength of the fiber, which will ultimately be treated with the amine, generally varies between different manufacturers of the fiber and between fiber types. As a result, this characteristic typically needs to be examined in determining the concentration and amount of amine to be used for a given treatment. As stated previously, the controlling factors that determine the amount of amine necessary are the inherent strength of the fiber, the amount of strength degradation required to achieve acceptable pilling performance for the particular product, and the lower limit of strength acceptable for the end-use of the article.

In one aspect of the invention, the process of the current invention requires no special equipment; standard textile dyeing and finishing equipment can be employed. By way of example, a textile fabric may be treated either in a batch operation, wherein chemical contact is prolonged, or in a continuous operation, wherein chemical contact with the fabric is shorter. Generally, a predetermined amount of the desired chemical is deposited onto the hydrolizable polymer-containing article, and the treated article is then exposed to a sufficient amount of heat for a predetermined amount of time, as will be discussed further below. The application of the chemical to the hydrolizable polymer-containing article may be accomplished by immersion coating, padding, spraying, foam coating, or by any other technique whereby one can apply a controlled amount of a liquid suspension to an article. Employing one or more of these application techniques may allow the chemical to be applied to a textile article in a uniform manner. As noted above, once the chemical has been applied to the article, the article is subjected to heat to obtain the desired reaction between the chemical and the article. A typical time and temperature relationship follows for this reaction. As the temperature is increased, the reaction time will generally decrease. For example, suitable temperatures for polyethylene terephthalate will generally range from about 180 to about 400 degrees F., and exposure times will typically range from about 1 to about 90 minutes. Heating can be accomplished by any technique typically used in manufacturing operations, such as dry heat from a tenter frame, microwave energy, infrared heating, steam, superheated steam, autoclaving, etc. or any combination thereof.

One process that has been found acceptable involves placing a textile fabric to be treated into a high temperature jet dyeing machine charged with dye liquor, adding the appropriate amount of a branched chain amine, heating the dye jet to a predetermined temperature, holding the temperature for a certain amount of time, cooling the machine to a lower temperature, dropping the liquor out of the dye jet, and finally rinsing the fabric with water, then acetic acid, and water again to remove any unreacted amine from the fabric surface. While acetic acid is commonly used in textile dyeing operations, other acids of similar nature, such as citric acid or formic acid could be used. In an alternative embodiment of the current invention, a small amount of a strong base, such as sodium hydroxide, is added to the amine treatment. This addition maintains a high pH in the dye liquor and thereby assists in forcing the reaction to proceed to completion, theoretically by decreasing the solubility of the amine in water, which increases the affinity of the amine to the fabric so the chemical reaction can occur. Adding dyes and auxiliary chemicals to the dye machine and dyeing the fabric can follow this treatment by suitable dyeing processes. Alternatively, with the appropriate dye selection, one can amine treat and dye the hydrolizable polymer-containing article in one step, or one could amine treat the article following the dyeing process.

As mentioned previously, a substituted hydrolizable polymer, wherein the substitute is a branched chain amine, is produced as a result of the chemical reaction that occurs between the hydrolizable polymer contained in the textile article undergoing treatment and the amine. The amine is comprised essentially of hydrogen, nitrogen, and carbon atoms, but it may, in some instances, further comprise oxygen atoms. During the aminolysis reaction that occurs between the polymer and the amine, some of the ester linkages of the hydrolizable polymer are cleaved by the branched chain amine molecule. The product of the reaction is typically an amide and an alcohol. The resulting substituted hydrolizable polymer may be in the form of a textile article such as a fiber, yarn, fabric, film, or any combination thereof. By way of example, a fabric containing this polymer may be incorporated into an article of apparel, bedding, commercial upholstery, residential upholstery, or automotive upholstery.

The following examples illustrate various embodiments of the present invention but are not intended to restrict the scope thereof. In the examples, all parts and percentages are by weight on the fabric unless otherwise noted.

Unless otherwise stated, all examples utilize fabric comprised of double knit (24 gauge) 100% polyester tuck construction. The fabric contains 29.16% 36.0/1 T-472 ring spun polyester yarns, 44.31% 27.0/1 T-472 ring spun polyester yarns and 26.53% 1/070/100 56T Danbury microdenier polyester yarns. The staple fiber T-472 is commercially available from Wellman, Inc. of Charlotte, N.C.; the microdenier polyester yarn 56T is commerically available from E. I du Pont de Nemours and Company of Wilmington, Del. The fibers were collectively spun into yarn by Milliken & Company of Spartanburg, S.C. Pilling is determined by ASTM D 3512-99A Method for Testing Random Tumble Pilling. Strength is determined by ASTM D 3786-87 Method for Testing Mullen Burst Strength.

EXAMPLE 1

The following example shows treatment of the polyester fabric with n-coco-1,3-propanediamine, a fatty diamine.

A 100 gram piece of fabric was placed into a Werner Mathis laboratory jet dye machine. Two liters of water, containing 0.75 grams of n-coco-1,3-propanediamine (Duomeen® CD from Akzo Nobel Surface Chemistry of Chicago, Ill.) and 0.50 grams of sodium hydroxide was added to the dye vessel. The dye vessel was sealed and heated to 266 degrees F. This temperature was maintained for 30 minutes, then the dye vessel was cooled to 160 degrees F. and emptied. The fabric was then rinsed with water, rinsed a second time with water containing 1.0 gram of acetic acid, and rinsed once more with water. The acetic acid was present to dissolve any residual, unreacted amine from the surface of the treated fabric. The treated fabric was subsequently dyed with a disperse dye, rinsed with water, and then dried and heat set following procedures that are known in the art. The Mullen Burst Strength and Random Tumble Pilling of the fabric was then measured and compared both before and after dyeing. This example was repeated 2 times. The results are shown in Table 1 and FIG. 1A.

EXAMPLE 2

Example 1 was repeated, except that in place of the n-coco-1,3-propanediamine, isotridecyloxypropyl-1,3-diaminopropane (available from Tomah Products, Inc. of Milton, Wis.), a branched alkyl amine according to the present invention, was used. This example was also repeated 2 times. The results are also shown in Table 1 and FIG. 1B.

TABLE 1

| Comparison of n-coco-1,3-propanediamine to isotridecyloxypropyl-1,3-diaminopropane | | | | |
|---|---|---|---|---|
| | Mullen Burst Strength | Randon Tumble Pilling | | |
| Example | (Pounds) | 30 min. | 60 min. | 90 min. |
| 1A | 81 | 3.5 | 3.0 | 3.5 |
| 1B | 90 | 2.5 | 3.0 | 4.0 |

TABLE 1-continued

Comparison of n-coco-1,3-propanediamine
to isotridecyloxypropyl-1,3-diaminopropane

| Example | Mullen Burst Strength (Pounds) | Randon Tumble Pilling | | |
|---|---|---|---|---|
| | | 30 min. | 60 min. | 90 min. |
| 1C | 83 | 3.0 | 4.5 | 4.5 |
| Average | 85 +/− 5 | 3.0 | 3.5 | 4.0 |
| 1A: Dyed | 77 | 4.5 | 4.5 | 4.5 |
| 1B: Dyed | 76 | 4.5 | 5.0 | 5.0 |
| 1C: Dyed | 77 | 4.0 | 4.5 | 4.5 |
| Average | 77 +/− 0.7 | 4.3 | 4.7 | 4.7 |
| 2A | 83 | 4.0 | 4.5 | 4.5 |
| 2B | 78 | 3.0 | 5.0 | 4.5 |
| 2C | 83 | 3.0 | 4.0 | 4.5 |
| Average | 81 +/− 3 | 3.3 | 4.5 | 4.5 |
| 2A: Dyed | 83 | 4.5 | 4.5 | 4.5 |
| 2B: Dyed | 78 | 4.0 | 4.5 | 4.0 |
| 2C: Dyed | 76 | 4.5 | 4.5 | 4.0 |
| Average | 79 +/− 4 | 4.3 | 4.5 | 4.2 |
| Untreated | 127 | 1.0 | 1.0 | 1.0 |

Two observations could be made regarding the data in Table 1. First, the batch to batch variation of the treatments was lower for the isotridecyloxypropyl-1,3-diaminopropane than for the n-coco-1,3-propanediamine treatments. Second, the amine reaction was essentially complete for the isotridecyloxypropyl-1,3-diaminopropane before the dyeing process. This typically indicates that this amine has been essentially consumed, whereas the n-coco-1,3-propanediamine sample contained residual, unreacted amine when the dye cycle began. This can lead to dye stains on the fabric due to the unreacted amine being exuded from inside the fabric and subsequent complexation with the dyestuff in the aqueous dye liquor. Both factors indicate the obvious benefits of the branched chain amine over the straight amine.

EXAMPLE 3

The following example shows how exposure to ambient air affects the state of matter for the fatty diamine by changing it from a liquid to a solid due to adsorption of carbon dioxide.

Approximately 2 grams of n-coco-1,3-propanediamine was exposed for two hours to the airflow under a laboratory hood. Essentially the entire product was changed from a clear liquid to a white waxy solid due to the adsorption of carbon dioxide from the air. When the same chemical was exposed for two hours under a dry nitrogen stream (i.e. a carbon dioxide free environment), it remained unchanged.

The above experiment was repeated with isodecyloxypropyl-1,3-diaminopropane, an amine of the present invention. No change was observed in the appearance of the chemical in either the air or dry nitrogen environments.

When the laboratory hood air exposed samples and samples directly from the container of n-coco-1,3-propanediamine were examined by a Hewlett Packard 6890 Gas Chromatography/Mass Spectroscopy machine, the only significant finding was an increase in the peak heights of the laboratory hood samples which generally indicates a greater mass of the chemical being detected. Since it is known that this amine will adsorb carbon dioxide from the air and react to form an insoluble carbamate, it is believed that only the carbamate is being detected. Due to the reaction rate, it is difficult to isolate the pure starting material by this technique. While techniques exist that should allow one to determine the percentage of amine that was converted to carbamate, these techniques were not investigated.

EXAMPLE 4

The following example shows how exposure of the amine to air affects the strength of the treated fabric.

Examples 1 and 2 were repeated 2 times each, except the amine in each case was intentionally exposed to the air for 2 hours before the treatment was performed. The results of this exposure to carbon dioxide in the air are shown in Table 2.

TABLE 2

Effect of Chemical Exposure to Air on Fabric Strength Loss

| Example | Sample | Average Mullen Burst Strength |
|---|---|---|
| 1A | Duomeen ® CD | 83 |
| 1B | Duomeen ® CD: Exposed to Air | 89 |
| 2A | Isotridecyloxypropyl-1,3-diaminopropane | 90 |
| 2B | Isotridecyloxypropyl-1,3-diaminopropane: Exposed to Air | 91 |

Table 2 shows that exposing Duomeen® CD to the ambient air generally increases the strength of the chemically treated product which, for the purposes of the present invention, adversely affects the pilling tendency of the fabric by making it harder for the pill ball to break away from the fabric. However, the fabric treated with isotridecyloxypropyl-1,3-diaminopropane does not show significant changes in its strength characteristic, and thus, exposure to the carbon dioxide in the ambient air does not detrimentally affect the pilling tendency of the treated fabric. This observed condition can be even more extreme in a production dye facility due to typical seasonal changes in temperature, humidity, airflow rates, and other chemical handling variables.

The above description and examples show that the present invention provides a novel method for reducing the pilling tendency of hydrolizable polymer-containing textile articles. Accordingly, the invention has many applicable uses for incorporation into articles of apparel, bedding, residential upholstery, commercial upholstery, automotive upholstery, and any other article wherein it is desirable to manufacture a product with reduced pilling tendency.

These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the scope of the invention described in the appended claims.

What I claim is:

1. A hydrolizable polymer-containing textile article that has been chemically modified by branched chain amine selected from the group consisting of Isodecyloxypropyl-1,3-diaminopropane, Isododecyloxypropyl-1,3-diaminopropane and Isotridecyloxypropyl-1,3-diaminopropane to achieve improved pilling resistance, wherein the hydrolizable polymer is selected from the group consisting of polyester, wool, polylactic acid, and combinations thereof;

wherein the textile article is selected from the group consisting of fibers, yarns, fabrics, films, and combinations thereof;

wherein strength of the textile article is reduced by chemical modification; and wherein the textile article is a fabric and said fabric achieves at least approximately 50 pounds, but not more than approximately 90 pounds.

2. A hydrolizable polymer-containing textile article that has been chemically modified by branched chain amine selected from the group consisting of Isodecyloxypropyl-1,3-diaminopropane, Isododecyloxypropyl-1,3-diaminopropane and Isotridecyloxypropyl-1,3-diaminopropane to achieve improved pilling resistance, wherein the hydrolizable polymer is selected from the group consisting of polyester, wool, polylactic acid, and combinations thereof;

wherein the textile article is selected from the group consisting of fibers, yarns, fabrics, films, and combinations thereof;

wherein resistance to pilling of the textile article is increased by chemical modification; and wherein the textile article is a fabric and said fabric achieves a rating of at least 3.0 when tested for Random Tumble Pilling after each of 30, 60, and 90 minutes.

3. A hydrolizable polymer-containing textile article that has been chemically modified by branched chain amine selected from the group consisting of Isodecyloxypropyl-1,3-diaminopropane, Isododecyloxypropyl-1,3-diaminopropane and Isotridecyloxypropyl-1,3-diaminopropane to achieve improved pilling resistance, wherein the hydrolizable polymer is selected from the group consisting of polyester, wool, polylactic acid, and combinations thereof;

wherein the textile article is selected from the group consisting of fibers, yarns, fabrics, films, and combinations thereof;

wherein resistance to pilling of the textile article is increased by chemical modification; and wherein the textile article is a fabric and said fabric achieves a rating of at least 3.5 when tested for Random Tumble Pilling after each of 30, 60, and 90 minutes.

4. A hydrolizable polymer-containing textile article that has been chemically modified by branched chain amine selected from the group consisting of Isodecyloxypropyl-1,3-diaminopropane, Isododecyloxypropyl-1,3-diaminopropane and Isotridecyloxypropyl-1,3-diaminopropane to achieve improved pilling resistance, wherein the hydrolizable polymer is selected from the group consisting of polyester, wool, polylactic acid, and combinations thereof;

wherein the textile article is selected from the group consisting of fibers, yarns, fabrics, films, and combinations thereof;

wherein resistance to pilling of the textile article is increased by chemical modification; and wherein the textile article is a fabric and said fabric achieves a rating of at least 4.0 when tested for Random Tumble Pilling after each of 30, 60, and 90 minutes.

5. A hydrolizable polymer-containing textile article that has been chemically modified by branched chain amine selected from the group consisting of Isodecyloxypropyl-1,3-diaminopropane, Isododecyloxypropyl-1,3-diaminopropane and Isotridecyloxypropyl-1,3-diaminopropane to achieve improved pilling resistance, wherein the hydrolizable polymer is selected from the group consisting of polyester, wool, polylactic acid, and combinations thereof;

wherein the textile article is selected from the group consisting of fibers, yarns, fabrics, films, and combinations thereof;

wherein resistance to pilling of the textile article is increased by chemical modification; and wherein the textile article is a fabric and said fabric achieves a rating of at least 4.5 when tested for Random Tumble Pilling after each of 30, 60, and 90 minutes.

6. A hydrolizable polymer-containing textile article that has been chemically modified by branched chain amine selected from the group consisting of Isodecyloxypropyl-1,3-diaminopropane, Isododecyloxypropyl-1,3-diaminopropane and Isotridecyloxypropyl-1,3-diaminopropane to achieve improved pilling resistance, wherein the hydrolizable polymer is selected from the group consisting of polyester, wool, polylactic acid, and combinations thereof;

wherein the textile article is selected from the group consisting of fibers, yarns, fabrics, films, and combinations thereof;

wherein resistance to pilling of the textile article is increased by chemical modification; and wherein the textile article is a fabric and said fabric achieves a rating of at least 5.0 when tested for Random Tumble Pilling after each of 30, 60, and 90 minutes.

* * * * *